(12) United States Patent
Kamibayashi et al.

(10) Patent No.: US 8,529,042 B2
(45) Date of Patent: *Sep. 10, 2013

(54) CLEAR INK COMPOSITION

(75) Inventors: Masashi Kamibayashi, Shiojiri (JP);
Shuichi Koganehira, Matsumoto (JP);
Hironori Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 591 days.

This patent is subject to a terminal disclaimer.

(21) Appl. No.: 12/456,030

(22) Filed: Jun. 10, 2009

(65) Prior Publication Data

US 2009/0304927 A1 Dec. 10, 2009

(30) Foreign Application Priority Data

Jun. 10, 2008 (JP) ................................. 2008-152108

(51) Int. Cl.
*B41J 2/01* (2006.01)
(52) U.S. Cl.
USPC ............................... 347/95; 347/100; 347/96
(58) Field of Classification Search
USPC ............ 347/100, 95, 96, 101, 102; 106/31.6, 106/31.27, 31.13; 523/160, 161
See application file for complete search history.

(56) References Cited

U.S. PATENT DOCUMENTS

| 6,793,721 | B2 * | 9/2004 | Shen et al. ............. 106/31.2 |
| 7,060,740 | B2 | 6/2006 | Kataoka et al. |
| 7,332,023 | B2 | 2/2008 | Rehman et al. |
| 7,537,652 | B2 | 5/2009 | Koganehira et al. |
| 2003/0189626 | A1 * | 10/2003 | Kataoka et al. ............ 347/98 |
| 2009/0176071 | A1 | 7/2009 | Koganehira et al. |

FOREIGN PATENT DOCUMENTS

| JP | 2003-201436 | 7/2003 |
| JP | 2003-201436 A | 7/2003 |
| JP | 2003-213179 | 7/2003 |
| JP | 2003-213179 A | 7/2003 |
| JP | 2003-253167 | 9/2003 |
| JP | 2003-253167 A | 9/2003 |
| JP | 2003-266916 A | 9/2003 |
| JP | 2003-335058 | 11/2003 |
| JP | 2003-335058 A | 11/2003 |
| JP | 2004-306556 A | 11/2004 |
| JP | 2004-306557 A | 11/2004 |
| JP | 2005-023253 A | 1/2005 |
| JP | 2005-052984 A | 3/2005 |
| JP | 2005-074655 A | 3/2005 |
| JP | 2005-082613 A | 3/2005 |
| JP | 2005-194500 | 7/2005 |
| JP | 2005-194500 A | 7/2005 |
| JP | 2006-249429 | 9/2006 |
| JP | 2006-249429 A | 9/2006 |
| JP | 2007-277342 | 10/2007 |
| JP | 2007-277342 A | 10/2007 |
| JP | 2007-291399 | 11/2007 |
| JP | 2007-291399 A | 11/2007 |
| JP | 2009-209338 A | 9/2009 |

* cited by examiner

*Primary Examiner* — Manish S Shah
(74) *Attorney, Agent, or Firm* — Nutter McClennen & Fish LLP; John J. Penny, Jr.; Lydia G. Olson

(57) ABSTRACT

A clear ink composition includes at least a slightly water-soluble alkanediol, a water-soluble alcohol as a dissolution aid for the slightly water-soluble alkanediol, water, and polymer fine particles, but does not include a colorant. A 10-Hz dynamic surface tension of the ink composition is 26 mN/m or less.

23 Claims, 1 Drawing Sheet

CLEAR INK COMPOSITION

Priority is claimed under 35 U.S.C. §119 to Japanese Patent Application No. 2008-152108 filed on Jun. 10, 2008, the entire disclosure of which is incorporated by reference.

BACKGROUND

1. Technical Field

The present invention relates to a clear ink composition used for ink jet recording methods. More specifically, the present invention relates to an ink composition for ink jet recording which is capable of forming high-quality records having excellent fixability and no printing spot on various recording media, particularly recording media with low water absorption, such as synthetic paper, printing paper for running-on, and the like.

2. Related Art

An ink jet recording method is a printing method in which ink droplets are scattered and allowed to adhere to a recording medium such as paper or the like. In recent years, innovative advance of ink jet recording techniques has made it possible to use an ink jet recording method in the field of high-definition printing which has been realized only by silver salt photography and offset printing. This trend has led to the development of inks for ink jet recording capable of realizing images having glossy impression comparable to that of silver salt photographs using, for ink jet recording, recording media with high glossiness comparable to printing paper, art paper, and the like which have been used in the field of silver salt photography and offset printing, i.e., specialty paper. Also, there has been developed inks for jet recording capable of realizing image quality comparable to silver salt photographs even by using plain paper.

In order to realize high image quality, it has been proposed to record by adhering an ink composition and a clear composition not containing a colorant to a recording medium. For example, Japanese Unexamined Patent Application Publication No. 2003-335058 has proposed that an image is formed using an ink composition containing a colorant, and a clear ink composition is adhered to the image.

In particular, in the printing field, desktop publishing (DTP) having been popularized with recent popularization of a technique of forming images from digital data. Even in printing by DTP, color proof is previously formed for confirming the glossy impression and color impression of actual prints. An ink jet recording system is applied to output of the proof. Since DTP requires color reproduction and stability reproduction of prints, specialty paper for ink jet recording is generally used as a recording medium.

Specialty paper for ink jet recording is prepared so as to exhibit the same glossy impression and color impression as those of an output obtained by actually printing on printing paper for running-on. Although the material of specialty paper is appropriately controlled according to the type of printing paper for running-on, the production of specialty paper matching with all of a variety of printing paper for running-on increases the production cost. Therefore, in application to color proof, it is desired to perform ink jet recording on printing paper for running-on rater than specialty paper. Also, it is considered that if printed matter produced by ink jet recording directly on printing paper for running-on can be used as a final proof sample without use of specialty paper, the cost required for proof can be significantly decreased. In addition, synthetic paper, which is widely used in printing fields and prepared by forming into a film a mixture of polyethylene resin, polyester resin, an inorganic filler, and the like, has excellent recycling properties and has recently attracted attention as an environment-friendly material.

Printing paper for running-on is coated paper including a coating layer provided on a surface thereof for receiving oil-based ink, but has a characteristic that the coating layer has a low ink absorbing ability. Therefore, when water-based pigment ink, which is generally used for ink jet recording, is used, bleeding or uneven coagulation may occur in an image due to low ink penetrability into a recording medium (printing paper for running-on).

With respect to this problem, for example, Japanese Unexamined Patent Application Publication No. 2005-194500 discloses a pigment-based ink having improved blurring and excellent glossiness for specialty paper and containing a polysiloxane compound as a surfactant and an alkanediol such as 1,2-hexanediol as a dissolution aid. Japanese Unexamined Patent Application Publication Nos. 2003-213179, 2003-253167, and 2006-249429 have proposed that diol such as glycerin, 1,3-butanediol, or the like, or a triol alcohol solvent such as pentaerythritol or the like is added to ink, for controlling penetrability of the ink to a recording medium, thereby forming high-quality images.

SUMMARY

The inventors have found that when an alcohol containing a slightly water-soluble alkanediol and a water-soluble alcohol as a dissolution aid for the slightly water-soluble alkanediol is used as a solvent of a clear ink composition, and the surface tension of the ink composition is adjusted to 26 mN/m or less, a high-quality image without white stripes and a feel of roughness can be realized even by using a recording medium with low liquid absorption, such as printing paper for running-on, as a recording medium to which a color ink and a clear ink composition are caused to adhere, and excellent fixability immediately after printing can be realized. The present invention has been achieved on the basis of this finding.

An advantage of some aspects of the invention is that the invention provides a clear ink composition capable of realizing a high-quality image without white stripes and a feel of roughness and realizing excellent fixability immediately after printing even by using a recording medium with low liquid absorption, such as printing paper for running-on, as a recording medium to which a color ink and a clear ink composition are caused to adhere.

A clear ink composition according to an embodiment of the present invention includes at least slightly water-soluble alkanediol, a water-soluble alcohol as a dissolution aid for the slightly water-soluble alkanediol, water, and polymer fine particles, but not include a colorant, and has a 10-Hz dynamic surface tension of 26 mN/m or less.

According to the present invention, it is possible to realize a high-quality image without white stripes and a feel of roughness and realize excellent fixability immediately after printing even by using a recording medium with low liquid absorption, such as printing paper for running-on, as a recording medium to which a color ink and a clear ink composition are caused to adhere.

BRIEF DESCRIPTION OF THE DRAWINGS

The invention will be described with reference to the accompanying drawings, wherein like numbers reference like elements.

DESCRIPTION OF EXEMPLARY EMBODIMENTS

<Definition>

Figure 1:
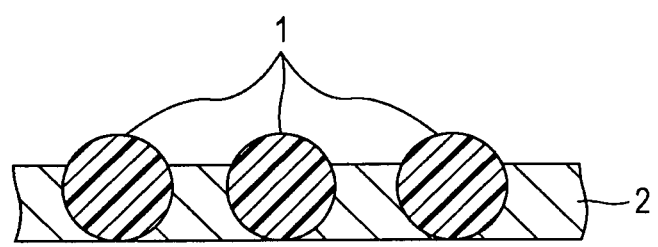
FIG. 1 is a sectional view schematically showing a film of a recorded image immediately after ejection and drying, the image being formed by ejecting a clear ink composition containing polyolefin wax to a recording surface.

In the specification, alkanediol may be either linear or branched.

The term "water-soluble" represents that water solubility (the amount of a solute relative to 100 g of water) at 20° C. is 10.0 g or more, and the term "slightly water-soluble" represents that water solubility (the amount of a solute relative to 100 g of water) at 20° C. is less than 1.0 g.

<Clear Ink Composition>

A clear ink composition according to an embodiment of the present invention includes at least slightly water-soluble alkanediol, a water-soluble alcohol as a dissolution aid for the slightly water-soluble alkanediol, water, and polymer fine particles, and but not include a colorant. The clear ink composition has a 10-Hz dynamic surface tension of 26 mN/m or less. When an ink composition contains a specified alcohol component and has a surface tension of 26 mN/m or less, it is possible to realize an ink composition excellent in ejection stability and capable of suppressing ink coagulation on printing paper for running-on, particularly art paper, POD paper (for example, Ricoh Business Coat Gloss 100 manufactured by Ricoh Co., Ltd., or the like), or laser printer specialty paper (for example, LPCCTA4 manufactured by Seiko Epson Corporation, or the like), which has relatively high ink absorbing ability, and realizing a high-quality image without white stripes and a feel of roughness even by printing with low resolution. In the specification, the term "10-Hz dynamic surface tension" represents a value measured at room temperature and 10 Hz using, for example, a dynamic tensiometer BP-2 (manufactured by KRUSS).

The term "coagulation" represents local color density spots of similar colors produced by printing as a plane (for example, monochrome (not indicating the number of ink colors) printing on a 6-inch square) but does not present that a portion not coated with ink remains on a recording medium surface or a coloring ink film surface. The term "white stripes" represents the phenomenon that a portion not coated with ink remains as stripes on a recording medium surface or a coloring ink film surface in the driving direction of a recording head without local color density spots of similar colors produced by printing in a plane (for example, monochrome printing on a 6-inch square). The term "feel of roughness or filling defect" represents the phenomenon that a portion not coated with ink remains on a recording medium surface without local color density spots of similar colors produced by printing in a plane as described above, and a recording medium surface or a coloring ink film surface has a feel of granular roughness.

The reason why a high-quality image without white stripes and a feel of roughness can be realized by adding a specified alcohol component and adjusting a 10-Hz dynamic surface tension to 26 mN/m or less is not known, but a possible reason is as follows:

The possible reason for ink coagulation in recording on printing paper for running-on is that the printing paper for running-on repels ink because of the high surface tension of ink dots and the large contact angle between the surface of the printing paper for running-on and an ink droplet. In recording with low resolution, even when white stripes or filling defects occur, ink coagulation can be suppressed by decreasing the surface tension of the ink adhered to the surface of the printing paper for running-on.

In addition, the possible reason for white stripes or filling defect in recording with low resolution is that adjacent ink dots adhering to the surface of printing paper for running-on contact each other and wet and spread with each other, thereby causing a mutual flow of undried ink. The mutual flow of ink is possibly caused by a difference in drying time between ink dots due to a difference in adhesion time between adjacent ink dots and the size of ink droplets at the time of adhesion. Therefore, it is thought to be preferred that in order to realize a high-quality image without white stripes and a feel of roughness even by printing with low resolution, ink having low surface tension and low mobility is adhered to printing paper for running-on.

However, drying of the ink dots adhered to the surface of printing paper for running-on is promoted and absorption of ink is also promoted unless a penetrable wetting agent is used for decreasing mobility of ink, and thus the time required for wetting and spreading ink dots with each other is lost. As a result, white stripes or filling defects possibly occur in recording with low resolution.

In the present invention, a high-quality image without white stripes or a feel of roughness can be realized by adjusting the 10-Hz dynamic surface tension of the clear ink composition to 26 mN/m or less. Although the reason for this is not known, clear ink does not contain a colorant and thus has a low solid content and generally has high mobility. Therefore, in order to suppress the high mobility, it is necessary for the ink to have very low surface tension. The ink droplets adhering to a recording medium such as printing paper for running-on requires about 10 seconds for penetration into the recording medium. Therefore, it is necessary for the ink to have not only low 1-Hz surface tension but also low 10-Hz surface tension.

The 1-Hz surface tension by a bubble pressure method represents the life of bubbles per second, i.e., the degree of allowed ink flow to bubbles. Namely, the 1-Hz surface tension represents mobility of ink 1 second after ink droplets adhere to the surface of printing paper for running-on. Therefore, it is thought that when the 10-Hz surface tension by the bubble pressure method is low, ink has low mobility, and coagulation is suppressed. The surface tension generally represents a value measured by a platinum plate pulling method and corresponds to a value measured at 1 Hz by the bubble pressure method.

In addition, in the present invention, a difference between 10-Hz dynamic surface tension and 1-Hz dynamic surface tension of the ink is preferably 1 mN/m or less. Therefore, coagulation spots can be further suppressed by providing surface tension not depending on frequency. As described above, it is thought that when the 1-Hz surface tension is low, ink mobility is also low. However, ink jet recording is performed by dot drawing, and a recording head is multi-driven to overlap dots, thereby forming an image. Therefore, adjacent ink dots may overlap each other and adhere to the recording medium within 10 seconds required until ink penetrates into the recording medium. When ink is ejected so that ink dots overlap each other, the time required until an ink droplet adheres to a dot previously adhered varies, and when ink mobility has time dependency, wetting and spreading varies, thereby possibly causing coagulation spots and deterioration of image quality. In the present invention, a difference between 10-Hz dynamic surface tension and 1-Hz dynamic surface tension of the ink is 1 mN/m or less, and thus ink mobility immediately after adhesion to a recording medium is not significantly different from mobility after ink permeates to some extent into the recording medium, thereby further improving coagulation spots.

In the present invention, the slightly water-soluble alkanediol is preferably an alkanediol having 7 or more carbon atoms and more preferably an alkanediol having 7 to 10 carbon atoms. Examples thereof include 1,2-heptanediol, 1,2-octanediol, 5-methyl-1,2-hexanediol, 4-methyl-1,2-hexanediol, 4,4-dimethyl-1,2-pentanediol, and the like. Among these, 1,2-octanediol is more preferred.

Examples of the water-soluble alcohol as the dissolution aid for dissolving the slightly water-soluble alkanediol include 1,2,6-hexanetriol, 3-methyl-1,5-pentanetriol, 3-methyl-1,3-butanediol, 3-methyl-1,5-pentanediol, dipropylene glycol, 1,2-hexanediol, 4-methyl-1,2-pentanediol, and mixtures of two or more of these.

Among these, a water-soluble alkanediol having a surface tension of 28 mN/m or less when prepared as a 15% aqueous solution is more preferred, and 1,2-hexanediol (surface tension: 26.7 mN/m) is particularly preferred from the viewpoint of odor during printing.

The content ratio between the slightly water-soluble alkanediol and the water-soluble alcohol is preferably 5:3 to 1:5 and more preferably 5:3 to 1:1. Within this range, the slightly water-soluble alkanediol can be stably dissolved in ink, and thus ejection stability is improved. On the other hand, when the ratio of the water-soluble alcohol is higher than the range, it is difficult to decrease both the initial viscosity and the coagulation spots. When the ratio of the water-soluble alcohol is lower than the range, it is difficult to stably dissolve the slightly water-soluble alkanediol in ink, thereby causing difficulty in suppressing viscosity change with the passage of time and maintaining storage stability.

The content of the slightly water-soluble alkanediol is preferably 2.0 to 5.0% by weight and more preferably 2.0 to 4.0% by weight relative to the whole of the ink composition. When the content is less than 2.0% by weight, printing spots may occur on a recording medium with low ink absorption, such as printing paper for running-on. On the other hand, when the content exceeds 5.0% by weight, the alkanediol is not completely dissolved in ink.

The content of the water-soluble alcohol is preferably 3.0 to 10.0% by weight and more preferably 4.0 to 7.0% by weight relative to the whole of the ink composition. When the content is less than 3.0% by weight, the slightly water-soluble alkanediol cannot be dissolved in ink in some cases. On the other hand, when the content exceeds 10.0% by weight, the initial viscosity of ink may be undesirably increased.

The clear ink composition of the present invention preferably contains a resin. When a resin is contained, a high-quality image without white stripes and a feel of roughness can be obtained, and a recorded image excellent in color forming property and glossiness can be obtained.

<Polymer Fine Particles>

The clear ink composition of the present invention contains the polymer fine particles as an essential component. When the polymer fine particles are contained, fixability of a recorded image immediately after printing can be improved.

As the polymer fine particles, at least one type selected from the group consisting of (i) a sulfonate group-containing polymer, (ii) a modified polyolefin emulsion, and (iii) polyolefin wax is preferred. When a sulfonate group-containing polymer is contained, glossy spots produced by abrasion of a recording surface can be effectively suppressed. When a modified polyolefin emulsion is contained, in stacking recorded images, transfer to the back surface can be suppressed, and abrasion resistance of a recording surface can be improved. In particular, a modified polyolefin emulsion has the function to soften an ink film, and when pressure is applied to a recording surface, an ink film is crushed to improve bonding force between components in ink, thereby improving abrasion resistance. Further, when polyolefin wax is added, damage to a recording surface can be suppressed. The polymer fine particles contained may be of at least one type.

The sulfonate group-containing polymer is preferably prepared by emulsion polymerization of an ethylenically unsaturated monomer in the presence of a reactive emulsifier containing a hydrophilic group, a hydrophobic group, and a radical reactive group.

When such a resin is added, it is possible to realize a recorded image having excellent fixability, light resistance, and gas resistance while maintaining glossiness comparable to silver salt photographs. Although the reason for this is not known, the possible reason is as follows. However, this is only assumption, and the reason is not limited to this. Namely, when an ethylenically unsaturated monomer is emulsion-polymerized in the presence of a reactive emulsifier, the amount of the free emulsifier remaining in a resin solution can be decreased as compared with the case where a free emulsifier exhibiting the excessive surfactant ability during ink drying is used. Therefore, the amount of the emulsifier remaining in a water-based ink composition can be decreased. Since the reactive emulsifier contains a hydrophilic group, the free reactive emulsifier is sufficiently compatible with the dispersed resin in the ink composition. When a chain transfer agent is added at the time of mixing of monomers, followed by contact with a polymerization initiator, the molecular weight is decreased. For this reason, a recorded image having excellent fixability, light resistance, and gas resistance may be realized while maintaining glossiness comparable to silver salt photographs.

The term "reactive emulsifier" represents an emulsifier having a degree of emulsifying ability which permits emulsion polymerization and being capable of radical polymerization.

The reactive emulsifier is a compound composed of a hydrophilic group, a hydrophobic group, and a radical reactive group. Examples of the hydrophilic group include a sulfate group, a carboxylic group, a polyoxyethylene group, and the like. Among these hydrophilic groups, a sulfate group and a polyoxyethylene group are particularly preferred. In particular, the reactive emulsifier preferably contains both the sulfate group and the polyoxyethylene group.

As the hydrophobic group constituting the reactive emulsifier, for example, an aliphatic alkyl group having 5 to 20 carbon atoms, an aromatic group, or the like is preferred. Among these, an aliphatic alkyl group having 8 to 15 carbon atoms is more preferred.

Examples of the radical reactive group constituting the reactive emulsifier include ethylenically unsaturated groups such as an acryl group, a methacryl group, an allyloxy group, a methallyloxy group, a propenyl group, and the like. In particular, an alloyoxy group and a propenyl group are preferred.

Examples of the reactive emulsifier which can be preferably used in the present invention include the following compounds:

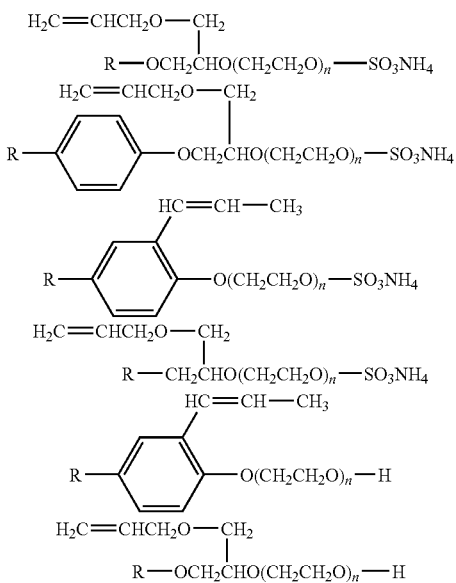

(wherein R represents an C5-C20 alkyl group, and n represents an integer of 5 to 40.)

Specific examples of the reactive emulsifier having an anionic functional group as the hydrophilic group include Latemul S-180 A (manufactured by Kao Corp.), Eleminol JS-2 (manufactured by Sanyo Chemical Industries, Ltd.), Aqualon KH-10, Aqualon HS-10, and Aqualon BC-10 (manufactured by Dai-Ichi Kogyo Seiyaku Co., Ltd.), Adeka Reasoap SE-10N (manufactured by Asahi Denka Kogyo Ltd.) and the like. Reactive emulsifiers in which the hydrophilic group is a cationic functional group can also be preferably used. Examples of the reactive emulsifier in which the hydrophilic group is a nonionic functional group include Aqualon RS-20 (manufactured by Dai-Ichi Kogyo Seiyaku Co., Ltd.), Adeka Reasoap ER-20 (manufactured by Asahi Denka Kogyo Ltd.) and the like. These reactive emulsifiers may be used alone or in a combination of two or more.

The content of the reactive emulsifier in the ink composition is preferably 0.5 to 5 parts by weight, more preferably 0.5 to 3 parts by weight, based on 100 parts by weight of the ethylenically unsaturated monomer, although the content of the reactive emulsifier depends upon the particle diameter of a resin emulsion which will be described later. When the reactive emulsifier is contained in this content range, the emulsion polymerization can be stably carried out and, at the same time, the resin is sufficiently emulsified. Further, when the reactive emulsifier is added to the ink composition, a problem of foaming does not occur.

In the ink composition according to the present invention, a nonreactive emulsifier such as an anionic emulsifier, a nonionic emulsifier, a cationic emulsifier, an amphoteric ion emulsifier, or a water soluble resin may be added in addition to the above-described reactive emulsifier. The use of a combination of the reactive emulsifier with the nonreactive emulsifier sometimes improves the storage stability of the emulsion.

Examples of the anionic emulsifier include alkali metal salts of higher alcohol sulfates, alkali metal salts of alkylbenzenesulfonic acid, alkali metal salts of dialkyl succinate sulfonic acid, alkali metal salts of alkyl diphenyl ether disulfonic acid, sulfonate salts of polyoxyethylene alkyl ether, sulfonate salts of polyoxyethylene alkyl phenyl ether, phosphate salts of polyoxyethylene alkyl ether, phosphate salts of polyoxyethylene alkyl phenyl ether, and the like.

Examples of the nonionic emulsifier include polyoxyethylene alkyl ethers, polyoxyethylene alkyl phenyl ethers, alkyl ethers containing a sugar chain as a hydrophilic group, and the like.

Examples of the cationic emulsifier include alkyl pyridyl chloride, alkyl ammonium chloride, and the like.

Examples of the amphoteric ion emulsifier include lauryl betaine, and the like.

Examples of the water-soluble resin include alkali neutralized products of polycarboxylic acid polymers produced by copolymerizing an aromatic monomer and a carboxyl group-containing monomer, polyvinyl alcohol, enzymatically degraded starch, and the like.

These nonreactive emulsifiers may be used alone or in combination of two or more.

The content of the nonreactive emulsifier in the ink composition is preferably 5 parts by weight or less relative to 100 parts by weight of ethylenically unsaturated monomer. However, when the water-soluble resin is used as the nonreactive emulsifier, the content of the nonreactive emulsifier is preferably 50 parts by weight or less relative to 100 parts by weight of ethylenically unsaturated monomer.

The resin constituting the ink composition according to the present invention is produced by emulsion polymerization of an ethylenically unsaturated monomer in the presence of the reactive emulsifier. The ethylenically unsaturated monomer utilized in the emulsion polymerization is not particularly limited, and examples thereof include diene monomers such as 1,3-butadiene, 1,2-butadiene, 1,2-pentadiene, 1,3-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, cyclopentadiene, dicyclopentadiene, and ethylidene norbornene; aromatic monomers such as styrene, α-methylstyrene, o-methylstyrene, p-methylstyrene, m-methylstyrene, vinylnaphthalene, and divinylstyrene; alkyl (meth)acrylates such as methyl(meth)acrylate, ethyl(meth)acrylate, n-propyl(meth)acrylate, i-propyl(meth)acrylate, n-butyl(meth)acrylate, n-amyl(meth)acrylate, i-amyl(meth)acrylate, hexyl(meth)acrylate, 2-ethylhexyl(meth)acrylate, octyl(meth)acrylate, i-nonyl(meth)acrylate, decyl(meth)acrylate, hydroxymethyl(meth)acrylate, and hydroxyethyl (meth)acrylate; unsaturated carboxylic acids such as itaconic acid, fumaric acid, (meth)acrylic acid, maleic acid, and crotonic acid; ethylenically unsaturated carboxylic acid alkylamides such as (meth)acrylamide and N-methylolacrylamide; vinyl carboxylates such as vinyl acetate and vinyl propionate; anhydrides, monoalkylesters, and monoamides of ethylenically unsaturated dicarboxylic acids; aminoalkyl esters of ethylenically unsaturated carboxylic acids such as aminoethylacrylate, dimethylaminoethylacrylate, and butylaminoethylacrylate; ethylenically unsaturated carboxylic acid aminoalkylamides such as aminoethylacrylamide, dimethylaminomethylmethacrylamide, and methylaminopropylmethacrylamino; vinyl cyanide compounds such as (meth)acrylonitrile and α-chroloacrylonitrile; and unsaturated aliphatic glycidyl esters such as glycidyl(meth)acrylate. These monomers may be used alone or in a combination of two or more.

Among these monomers, 1,3-butadiene, isoprene, styrene, and alkyl (meth)acrylates which are (meth)acrylic monomers such as methyl(meth)acrylate, ethyl(meth)acrylate, n-butyl (meth)acrylate, and 2-ethylhexyl(meth)acrylate are preferred. Particularly preferred are alkyl(meth)acrylates.

The ethylenically unsaturated monomer may contain a functional group such as an alkoxysilane group, an epoxy group, a hydroxyl group, or a polyethylene oxide group. The presence of such a functional group can improve compatibility of the resin with each component in the ink composition. Among these, an alkoxysilane group-containing monomer is particularly preferred.

Examples of an alkoxysilane group-containing monomer include γ-methacryloxypropyltriethoxysilane, γ-acryloxypropyltriethoxysilane, γ-methacryloxypropyltrimethoxysilane, γ-acryloxypropyltrimethoxysilane, vinyltriethoxysilane, and vinyltrimethoxysilane. Examples of an epoxy group-containing monomer include glycidyl(meth)acrylate. Examples of a hydroxyl group-containing monomer include 2-hydroxyethylmethacrylate. Examples of a polyethylene oxide group-containing monomer include polyethylene glycol monomethacrylate which is available as Blemmer PE 200 (manufactured by Nippon Oils & Fats Co., Ltd.).

Preferably, the functional group-containing monomer is contained in an amount of 10% by weight or less, more preferably 5% by weight or less in the monomer.

The resin is produced by emulsion polymerization of the above-described ethylenically unsaturated monomer in the presence of a reactive emulsifier comprising a hydrophilic group, a hydrophobic group, and a radical reactive group.

The emulsion polymerization is carried out by mixing 100 parts by weight of the ethylenically unsaturated monomer with 0.5 to 5 parts by weight of the reactive emulsifier and 100 to 5,000 parts by weight of water, adding an ethylenically unsaturated monomer and a radical polymerization initiator to the resultant mixture, and allowing a reaction to proceed at a polymerization temperature of 5 to 100° C. for 0.1 to 10 hours. The polymerization temperature is preferably 30 to 90° C., and the polymerization time is preferably 2 to 5 hours.

Examples of a radical polymerization agent include: redox initiators comprising a combination of an oxidizing agent comprising an organic hydroperoxide such as cumene hydroperoxide, diisopropylbenzene peroxide, or diisopropylbenzene hydroperoxide with a reducing agent of a sugar-containing pyrophosphoric acid/sulfoxylate mixture; persulfates such as potassium persulfate and ammonium persulfate; azo initiators such as azobisisobutyronitrile, dimethyl-2,2'-azobisisobutylate, and 2-carbamoylazoisobutyronitrile; and organic peroxides such as benzoyl peroxide and lauroyl peroxide. Among these, organic peroxides are preferred.

In the emulsion polymerization, if necessary, another emulsifier, an organic solvent, and the like may be used. The method for adding the ethylenically unsaturated monomer is not particularly limited and may be any of batch addition, continuous addition, divided addition, and the like.

In the present invention, preferably, the ethylenically unsaturated monomer is emulsion polymerized in the presence of a chain transfer agent in addition to the reactive emulsifier. The combined use of the reactive emulsifier and the chain transfer agent can realize recorded images having further improved glossy impression, fixation, light resistance, and gas resistance. The reason for this has not been fully elucidated yet, but is believed to reside in that, in the emulsion polymerization, the chain transfer agent is bonded to a polymer end of the resin. However, it should be noted that the above mechanism is hypothetical and should not be construed as limiting the scope of the present invention.

Examples of the chain transfer agent usable herein include mercaptans such as octyl mercaptan, n-dodecyl mercaptan, tert-dodecyl mercaptan, n-hexadecyl mercaptan, n-tetradecyl mercaptan, and tert-tetradecyl mercaptan; xanthogen disulfides such as dimethylxanthogen disulfide, diethylxanthogen disulfide, and diisopropylxanthogen disulfide; thiuram disulfides such as tetramethylthiuram disulfide, tetraethylthiuram disulfide, and tetrabutylthiuram disulfide; halogenated hydrocarbons such as carbon tetrachloride and ethylene bromide; hydrocarbons such as pentaphenylethane, 1,1-diphenylethylene, and α-methylstyrene dimer; and other chain transfer agents such as acrolein, methacrolein, ally alcohol, 2-ethylhexylthioglycolate, terpinolene, α-terpinene, γ-terpinene, and dipentene. Among them, mercaptans, xanthogen disulfides, thiuram disulfides, carbon tetrachloride, 1,1-diphenylethylene, α-methylstyrene dimer, and 2-ethylhexylthioglycolate are preferred. The above chain transfer agents may be used alone or in a combination of two or more.

The amount of the chain transfer agent added is 0.1 to 10 parts by weight, preferably 0.2 to 7 parts by weight, more preferably 0.2 to 5 parts by weight, particularly preferably 0.3 to 3 parts by weight, based on 100 parts by weight in total of the ethylenically unsaturated monomer and the reactive emulsifier. When the amount of the chain transfer agent added is in the above-defined range, the glossiness of the record is further improved and, at the same time, satisfactory abrasion resistance can be provided.

The resin thus obtained is present in an emulsion form in the polymerization solution. In the ink composition according to the present invention, the resin is preferably present in an emulsion form in the ink composition (hereinafter referred to as "resin emulsion"). The average particle diameter of the resin emulsion is preferably 10 to 100 nm, more preferably 30 to 60 nm. When the average particle diameter exceeds 100 nm, the storage stability becomes unstable and the formation of a thin and even film by electrodeposition is difficult. Further, compatibility with each component in the ink composition is lowered. On the other hand, when the average particle diameter is less than 10 nm, the polymerization stability is significantly deteriorated. The average particle diameter may be regulated by varying the type and mixing ratio of the monomer and the amount of the chain transfer agent and emulsifier added. In the present invention, the average particle diameter refers to a value as measured with Photal PAR-III (manufactured by Otsuka Electronics Co., Ltd.).

The weight-average molecular weight of the sulfonate group-containing polymer thus obtained is preferably 10,000 to 100,000, more preferably 30,000 to 70,000. When the polymer has relatively low molecular weight, the emulsion is easily fused upon ink drying. The weight-average molecular weight of the resin may be regulated by varying the type and addition amount of the polymerization initiator or by using a chain transfer agent.

Next, from the viewpoint of transfer suppression, a modified polyolefin emulsion is preferably produced by modifying polyolefin having a weight-average molecular weight (Mw) of 1,000 to 50,000 with an unsaturated carboxylic acid or an anhydride thereof, and then dispersing the modified product in water in the presence of a basic compound and an emulsifier. The unsaturated carboxylic acid is preferably maleic acid and/or maleic anhydride.

An example of the modified polypropylene emulsion is one prepared by modifying low-molecular-weight polypropylene by a known method using heating reaction or an organic peroxide. For example, low-molecular-weight polypropylene is modified by heat melting and grafting an unsaturated carboxylic acid or an anhydride thereof in the presence of an aromatic solvent or a chlorine solvent or in the presence of a peroxide radical generating catalyst in an inert gas atmosphere.

In addition, a commercial modified polyolefin emulsion can be used. For example, AQUACER 515 (polyethylene wax, particle diameter 100 to 200 nm, melting point 130° C., solid content 30%, manufactured by BYK Chemie Japan) which is prepared by modifying the low-molecular-weight polypropylene to low-molecular-weight polyethylene can be preferably used.

Figure 2:
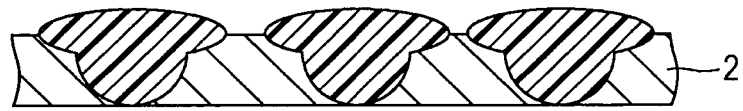
FIG. 2 is a sectional view schematically showing a film of a recorded image after an abrasion factor is applied to the film surface shown in FIG. 1.

The polyolefin wax including polymer fine particles preferably has a particle size larger than the dry thickness of a film formed by ejecting the ink composition to a recording surface. When the polyolefin wax is adhered as particles projecting from the ink film to the recording surface, polyolefin wax particles are crushed when pressure is applied to the recording surface, so that slipping of the top surface of the ink film can be improved. That is, when the clear ink composition adheres to a recording medium and is dried, polyolefin wax particles 1 project from an ink film 2 as shown in FIG. 1. In this state, when the influence of an external factor which causes abrasion is applied to a recorded image, the projecting portions of the polyolefin wax particles 1 spread on the film surface as shown in FIG. 2. The spreading wax prevents abrasion of the recorded image, thereby exhibiting abrasion resistance.

The particle size of the polyolefin wax is preferably 76 nm or more, particularly 150 nm or more, more preferably 200 nm or more, and most preferably 200 nm to 1 μm. The particle size of the polyolefin wax represents a particle diameter (average) as measured by a microtrack method.

The polyolefin wax preferably has a melting point or softening point by a ball and ring method (JIS K 2207) of 110° C. or more, particularly 110 to 150° C., from the viewpoint that the polyolefin wax easily remains as particles on a film fixed to an ink recording surface.

The polyolefin wax preferably has hardness of 1 to more, more preferably hardness of 1 or more, more preferably 2 to 5, according to a penetration method (JIS K 2207).

The polyolefin wax is not particularly limited as long as particles having a predetermined particle diameter can be maintained in a film (a coating film of a recorded image or the like) formed by ejecting the ink composition to a recording surface. For example, wax or copolymer produced from an olefin such as ethylene, propylene, butylene, or the like or a derivative thereof, can be used. Specifically, polyethylene wax, polypropylene wax, polybutylene wax, and the like can be used alone or in combination of two or more.

As the polyolefin wax, commercial polyolefin wax can be used. Specific examples thereof include Chemipearl series products such as Chemipearl W4005 (polyethylene wax, particle size 200 nm to 800 nm, softening point 110° C. (ring and ball method), hardness 3 (penetration method), solid content 40%, manufactured by Mitsui Chemicals, Inc.) and the like. In addition, polyolefin wax described in Japanese Unexamined Patent Application Publication No. 2003-201436 can be preferably used.

The clear ink composition according to the present invention may contain at least one of the above-described three types of resins or may be combined with another resin. For example, when the modified polyolefin emulsion, the polyolefin wax, and a sulfonate group-containing polymer are combined, the modified polyolefin emulsion and the polyolefin wax are suppressed from being excessively crushed by abrasion, glossy spots are suppressed by the effect of adjusting a change in refractive index, and fixation of the polymer fine particles is improved.

<Surfactant>

The clear ink composition according to the present invention preferably further contains a surfactant. By using a surfactant, images having excellent glossiness can be realized on a recording medium having a surface coated with a resin for receiving ink, particularly a recording medium such as photographic paper or the like in which glossiness is regarded as important. In particular, even when a recording medium including a surface receiving layer provided with a coating layer for receiving oil-based ink, e.g., printing paper for running-on, is used, it is possible to prevent bleeding between colors and prevent whitening due to reflected light with an increase in ink deposit.

As the surfactant used in the present invention, an organopolysiloxane surfactant can be preferably used. In this case, when a recorded image is formed, wettability to a recording medium surface can be increased to improve penetrability. When the organopolysiloxane surfactant is used, the solubility of the surfactant in ink is improved due to the ink composition contains the three types of alcohol solvents, and the occurrence of insoluble substances can be suppressed, thereby realizing an ink composition more excellent in ejection stability.

As the surfactant, a commercial surfactant, for example, PD-501, PD-502, and PD-570 (manufactured by Shin-Etsu Chemical co., Ltd.) can be used.

As the organopolysiloxane surfactant, the ink composition more preferably contains at least one compound represented by the following formula (I):

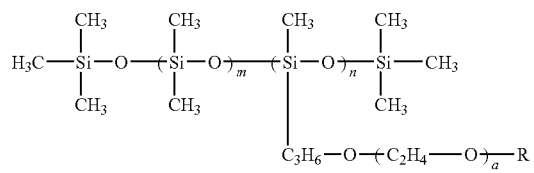

(wherein R represents a hydrogen atom or a methyl group, a represents an integer of 2 to 11, m represents an integer of 2 to 50, and n represents an integer of 1 to 5) or at least one compound of the formula (I) in which R is a hydrogen atom or a methyl group, a is an integer of 2 to 13, m is an integer of 2 to 50, and n is an integer of 1 to 5. Also, the ink composition more preferably contains at least one compound of the formula (I) in which R is a hydrogen atom or a methyl group, a is an integer of 2 to 13, m is an integer of 2 to 50, and n is an integer of 1 to 8. Alternatively, the ink composition more preferably contains at least one compound of the formula (I) in which R is a methyl group, a is an integer of 6 to 18, m is 0, and n is 1. By using such a specified organopolysiloxane surfactant, uneven coagulation of ink can be more improved even in printing on printing paper for running-on as a recording medium.

As a compound of the formula (I), a compound in which a is an integer of 2 to 5, m is an integer of 20 to 40, and n is an integer of 2 to 4, a compound in which a is an integer of 7 to 11, m is an integer of 30 to 50, and n is an integer of 3 to 5, a compound in which a is an integer of 9 to 13, m is an integer of 2 to 4, and n is an integer of 1 to 2, or a compound in which a is an integer of 6 to 10, m is an integer of 10 to 20, and n is an integer of 4 to 8 is more preferably used. By using such a compound, uneven coagulation of ink can be more improved.

As a compound of the formula (I), a compound in which R is a hydrogen atom, a is an integer of 2 to 5, m is an integer of 20 to 40, and n is an integer of 2 to 4 or a is an integer of 7 to 11, m is an integer of 30 to 50, and n is an integer of 3 to 5 is more preferably used. By using such a compound, uneven coagulation of ink or bleeding can be more improved.

As a compound of the formula (I), a compound in which R is a methyl group, a is an integer of 9 to 13, m is an integer of 2 to 4, and n is an integer of 1 to 2 or a is an integer of 6 to 10, m is an integer of 10 to 20, and n is an integer of 4 to 8 is more preferably used. By using such a compound, uneven coagulation of ink or bleeding can be more improved.

As a compound of the formula (I), a compound in which R is a methyl group, a is an integer of 6 to 12, m is 0, and n is 1 is more preferably used. By using such a compound, uneven coagulation or bleeding of ink can be more improved.

As a compound of the formula (I), a mixture of a compound in which R is a hydrogen atom, a is an integer of 7 to 11, m is an integer of 30 to 50, and n is an integer of 3 to 5, a compound in which R is a methyl group, a is an integer of 9 to 13, m is an integer of 2 to 4, and n is an integer of 1 to 2, and a compound in which R is a methyl group, a is an integer of 6 to 10, m is an integer of 10 to 20, and n is an integer of 4 to 8 is most preferably used. By using such compounds, uneven coagulation or bleeding of ink can be more improved.

As a compound of the formula (I), a mixture of a compound in which R is a hydrogen atom, a is an integer of 7 to 11, m is an integer of 30 to 50, and n is an integer of 3 to 5, a compound in which R is a methyl group, a is an integer of 9 to 13, m is an integer of 2 to 4, and n is an integer of 1 to 2, and a compound in which R is a methyl group, a is an integer of 6 to 18, m is 0, and n is 1 is most preferably used. By using such compounds, uneven coagulation or bleeding of ink can be more improved.

The content of the surfactant in the clear ink composition according to the present invention is preferably 0.01 to 1.0% by weight and more preferably 0.05 to 0.50% by weight. A combination of the surfactant containing a methyl group as R and the surfactant containing a hydrogen atom as R is more preferred because small font characters are not blurred. In particular, when the surfactant containing a methyl group as R is used, the content is preferably higher than that when the surfactant containing a hydrogen atom as R is used from the viewpoint of ink coagulation spots.

The content of the surfactant containing a hydrogen atom as R is more preferably as higher as possible than the content of the surfactant containing a methyl group as R. In this case, ink coagulation spots and blurring can be improved even with printing paper for running-on, which easily repels ink and has a low penetration rate, such as cast coated paper or the like.

The clear ink composition according to the present invention may further contain another surfactant, specifically, an acetylene glycol surfactant, an anionic surfactant, a nonionic surfactant, an amphoteric surfactant, or the like.

Examples of an acetylene glycol surfactant include 2,4,7, 9-tetramethyl-5-decyne-4,7-diol, 3,6-dimethyl-4-octyne-3, 6-diol, 3,5-dimethyl-1-hexyne-3-ol, 2,4-dimethyl-5-hexyne-3-ol, and the like. As the acetylene glycol surfactant, a commercial product can also be used. Examples of a commercial product include Olfine E1010, STG, and Y (trade name, manufactured by Nissin Chemical Industry, Co., Ltd.), and Surfynol 61, Surfynol 104, Surfynol 82, Surfynol 465, Surfynol 485, and Surfynol TG (trade name, manufactured by Air Products and Chemicals, Inc.).

<Water and Other Components>

The clear ink composition according to the present invention contains the above-described specified alcohol solvent, other various additives, and water as a solvent. As water, pure water or ultrapure water such as ion exchanged water, ultrafiltrated water, Milli-Q water, distilled water, or the like is preferably used. In particular, water prepared by sterilizing such water by ultraviolet irradiation, hydrogen peroxide addition, or the like is preferred because the occurrence of mold and bacteria can be prevented over a long period of time.

The clear ink composition according to the present invention preferably contains a penetrating agent in addition to the above components.

As the penetrating agent, glycol ethers can be used.

Specific examples of glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used alone or as a mixture of two or more.

Among the above glycol ethers, alkyl ethers of polyhydric alcohols are preferred. In particular, ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, and triethylene glycol mono-n-butyl ether are preferred. Triethylene glycol mono-n-butyl ether is more preferred.

The amount of the penetrating agent added may be properly determined. Preferably, however, the amount of the penetrating agent added is about 0.1 to 30% by weight, more preferably about 1 to 20% by weight.

The clear ink composition according to the present invention may contain a recording medium solubilizer in addition to the above components.

As the recording medium solubilizer, pyrrolidones such as N-methyl-2-pyrrolidone can be preferably used. The amount of the recording medium solubilizer added may be properly determined, but is about 0.1 to 30% by weight, more preferably about 1 to 20% by weight.

Preferably, the clear ink composition according to the present invention substantially does not contain a wetting agent. The wetting agent has the function to prevent drying and solidification of ink in ink jet nozzles or the like. Therefore, when ink is dropped on synthetic paper having a low ink absorbing ability, the ink is not dried to cause a problem in high-speed printing in some cases. When ink containing a wetting agent is used, the ink adheres to a recording medium in a state where the ink not absorbed is present on a surface of the recording medium, and thus coagulation spots may occur.

Therefore, in the present invention, when such a recording medium having the low ink absorbing ability is used, preferably the wetting agent is not substantially contained. Even when ink is dried and solidified in ink jet nozzles, the solidified ink can be re-dissolved using a solution containing a wetting agent.

In particular, when synthetic paper having low ink absorption is used, preferably, a wetting agent which is liquid at 20° C. is not substantially contained.

In the specification, the term "wetting agent" represents a wetting agent usually used for ink jet recording ink. Specific examples of the wetting agent include glycerin, ethylene glycol, diethylene glycol, triethylene glycol, propylene glycol, water-soluble alkanediols having 3 to 5 carbon atoms, such as 1,3-propanediol, 3-methyl-1,3-butanediol, 1,3-butanediol, 1,2-pentanediol, and the like, trimethylolpropane, trimthylolmethane, trimethylolethane, and the like. Among these, glycerin is preferred from the viewpoint of influence on 10-Hz surface tension. The expression "substantially not contain" represents that the amount of the wetting agent added is less than 1% by weight relative to the ink composition. Although it is obvious to persons skilled in the art that the penetrating solvent also partially functions as a wetting agent, in the specification, the penetrating solvent is not included in the wetting agent.

The ink composition according to the present invention may further contain a nozzle clogging preventive, a preservative, an antioxidant, an electric conductivity adjustor, a pH adjustor, a viscosity modifier, a surface tension modifier, a oxygen absorber, and the like.

Examples of the preservative or fungicide include sodium benzoate, pentachlorophenol sodium, 2-pyridinethiol-1-oxide sodium, sodium sorbate, sodium dehydroacetate, and 1,2-dibenzinethiazolin-3-one (Proxel CRL, Proxel BND, Proxel GXL, Proxel XL-2, and Proxel TN, manufactured by ICI).

Examples of the pH adjustor, dissolution aid, or antioxidant include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof.

The ink composition according to the present invention may contain an antioxidant and an ultraviolet absorber, and examples thereof include Tinuvin 328, 900, 1130, 384, 292, 123, 144, 622, 770, and 292, Irgacor 252 and 153, and Irganox 1010, 1076, 1035, and MD 1024, manufactured by Ciba Specialty Chemicals, K.K.; and lanthanide oxides.

Ink Set

An ink set according to the present invention contains at least the above-mentioned clear ink composition, a black ink composition, a yellow ink composition, a magenta ink composition, and a cyan ink composition. In addition, at least one of the color ink compositions used, i.e., a black ink composition, a yellow ink composition, a magenta ink composition, and a cyan ink composition, preferably has a 10-Hz dynamic surface tension of 26 mN/m or less. The color ink compositions used preferably have a difference of 1 mN/m or less between 10-Hz dynamic surface tension and 1-Hz dynamic surface tension. By using a combination of the color ink compositions and the clear ink composition, a high-quality image without white stripes and a feel of roughness can be realized even by using a recording medium having low absorption, such as printing paper for running-on, as a recording medium, and excellent fixability can be realized immediately after printing.

The black ink composition which is preferably used in the present invention is described.

Examples of a pigment contained in the black ink composition include inorganic pigments such as carbons, iron oxide pigments, and the like, e.g., lampblack (C. I. Pigment Black 6), acetylene black, furnace black (C. I. Pigment Black 7), channel black (C. I. Pigment Black 7), carbon black (C. I. Pigment Black 7), and the like; organic pigments such as aniline black (C. I. Pigment Black 1), and the like. In the present invention, carbon black is preferably used. Specific examples of carbon black include #2650, #2600, #2300, #2200, #1000, #980, #970, #966, #960, #950, #900, #850, MCF-88, #55, #52, #47, #45, #45L, #44, #33, #32, and #30 (manufactured by Mitsubishi Chemical Corporation), Special Black 4A, 550, Printex 95, 90, 85, 80, 75, 45, and 40 (manufactured by Degussa), Regal 660, Rmogul L, Monarch 1400, 1300, 1100, 800, and 900 (manufactured by Cabot Corporation); Raven 7000, 5750, 5250, 3500, 2500 ULTRA, 2000, 1500, 1255, 1200, 1190 ULTRA, 1170, 1100 ULTRA, and Raven 5000 U111, (manufactured by Columbian Carbon Co., Ltd.), and the like. Among these, in particular, when C. I. Pigment Black 6 and/or C. I. Pigment Black 7 is used, an image having excellent color hue can be realized.

The pigment solid content of the black ink composition used in the ink set according to the present invention is not particularly limited, but is preferably 6% by weight or more from the viewpoint of securing the color development properties in a recorded image.

The black ink composition which can be preferably used in the present invention contains as an alcohol solvent at least two types of organic solvents, i.e., a water-soluble alcohol solvent and a slightly water-soluble alcohol solvent. When the two types of alcohol solvents are contained as an essential component, ink coagulation can be suppressed on printing paper for running-on, particularly art paper, POD specialty paper (for example, Ricoh Business Coat Gloss 100 or the like), or laser printer paper (for example, Seiko Epson LPC-CTA4 or the like), which has relative high ink absorption ability, and a high-quality image without white stripes and a feel of roughness even can be realized by printing with low resolution.

The water-soluble alcohol solvent used in the present invention is not particularly limited, but at least one water-soluble alkanediol or a combination of at least one water-soluble alkanediol and at least one water-soluble alkanetriol is preferably used.

The water-soluble alkanediol preferably includes at least one alkanediol having 4 to 6 carbon atoms in its main chain, and more preferably includes 1,2-alkanediol which may have a branched chain and 1,3-alkanediol which may have a branched chain. Examples of the water-soluble alkanediol include 1,2-hexanediol, 1,2-pentanediol, 1,2-butanediol, 4-methyl-1,2-pentanediol, 3,3-dimethyl-1,2-butanediol, 3-methyl-1,3-butanediol, 2-methyl-1,3-propanediol, and the like. Among these, a water-soluble alkanediol having a surface tension of 28 mN/m or less when prepared as a 15% aqueous solution is more preferred, and 1,2-hexanediol (surface tension: 26.7 mN/m), 4-methyl-1,2-pentanediol (surface tension: 25.4 mN/m), and 3,3-dimethyl-1,2-butanediol (surface tension: 26.1 mN/m) are particularly preferred. From the viewpoint of odor during printing, 1,2-hexanediol is preferred.

The water-soluble alkanetriol is a substance exhibiting viscosity like glycerin. Also, the water-soluble alkanetriol is a penetrating lubricant exhibiting lower surface tension than that of glycerin. For example, a 10% aqueous solution of 1,2,6-hexanetriol has a surface tension of 54 mN/m, and a 10% aqueous solution of 3-methylpentane-1,3,5-triol (manufactured by Tokyo Chemical Industry Co., Ltd. CAS: 7564-64-9) has a surface tension of 49 mN/m.

As the water-soluble alkanetriol, alkanetriol having 5 or more carbon atoms in its main chain is preferred, and examples thereof include 1,2,6-hexanetriol, 3-methylpentane-1,3,5-triol, and the like. In particular, 1,2,6-hexanetriol is preferred from the viewpoint of ink intermittent printability, and 3-methylpentane-1,3,5-triol is preferred from the viewpoint of ink fixability.

The slightly water-soluble alcohol solvent used in the present invention is preferably an alkanediol, more preferably an alkanediol having 7 or more carbon atoms, and most preferably an alkanediol having 7 to 10 carbon atoms. Examples thereof include 1,2-heptanediol, 1,2-octanediol, 5-methyl-1,2-hexanediol, 4-methyl-1,2-hexanediol, 4,4-dimethyl-1,2-pentanediol, and the like. Among these, 1,2-octanediol is more preferred.

In the two types of alcohol solvents, the content ratio between the slightly water-soluble alcohol solvent and the water-soluble alcohol is preferably 1:1 to 1:6 and more preferably 1:1 to 1:3. Within this range, the slightly water-soluble alcohol solvent can be stably dissolved in ink, and thus ejection stability is improved. On the other hand, when the ratio of the water-soluble alcohol is higher than the range, it is difficult to decrease both the initial viscosity of ink and the coagulation spots. When the ratio of the water-soluble alcohol is lower than the range, it is difficult to stably dissolve the slightly water-soluble alcohol solvent in ink, thereby causing difficulty in suppressing viscosity change with the passage of time and maintaining storage stability.

The content ratio between the slightly water-soluble alcohol solvent and the water-soluble alkanediol is preferably 1:1 to 1:6 and more preferably 1:1 to 1:3. Within this range, the slightly water-soluble alcohol solvent can be stably dissolved in ink, and thus ejection stability is improved. On the other hand, when the ratio of the water-soluble alkanediol is higher than the range, it is difficult to decrease both the initial viscosity of ink and the coagulation spots. When the ratio of the water-soluble alkanediol is lower than the range, it is difficult to stably dissolve the slightly water-soluble alcohol solvent in ink, thereby causing difficulty in suppressing viscosity change with the passage of time and maintaining storage stability.

The content ratio between the slightly water-soluble alcohol solvent and the water-soluble alkanetriol is preferably 1:1 to 1:8 and more preferably 1:1 to 1:6. Within this range, it is possible to decrease the initial viscosity of ink and realize excellent recovery of clogging. On the other hand, when the ratio of the water-soluble alkanetriol is higher than the range, the ink initial viscosity is increased, and drying property is decreased. When the ratio of the water-soluble alkanetriol is lower than the range, clogging recovery is degraded, and drying property is enhanced. Therefore, a time required for ink wetting and spreading cannot be secured, and a recording medium cannot be covered with ink, thereby easily causing white stripes.

The content ratio between the water-soluble alkanediol and the water-soluble alkanetriol is preferably 2:1 to 1:18 and more preferably 1:1 to 1:3. Within this range, when printing is performed on printing paper for running on with low resolution, it is possible to suppress white stripes and a feel of roughness. On the other hand, when the ratio of the water-soluble alkanetriol is higher than the range, the ink initial viscosity is increased, and drying property is decreased. When the ratio of the water-soluble alkanetriol is lower than the range, clogging recovery is degraded, and drying property is enhanced. Therefore, a time required for ink wetting and spreading cannot be secured, and a recording medium cannot be covered with ink, thereby easily causing white stripes.

Further, in the present invention, the total content of the slightly water-soluble alcohol solvent and the water-soluble alcohol is preferably 11% by weight or less relative to the ink composition. Within this range, coagulation spots do not occur on a recording medium having low ink absorption, such as printing paper for running on, and ejection stability is excellent.

Also, in the present invention, the total content of the slightly water-soluble alcohol solvent and the water-soluble alkanediol is preferably 11% by weight or less relative to the ink composition. Within this range, coagulation spots do not occur on a recording medium having low ink absorption, such as printing paper for running on, and ejection stability is excellent.

Further, in the present invention, the total content of the slightly water-soluble alcohol solvent and the water-soluble alkanetriol is preferably 11% by weight or less relative to the ink composition. Within this range, coagulation spots do not occur on a recording medium having low ink absorption, such as printing paper for running on, and ejection stability and curl suppression are excellent.

On the other hand, the content of the water-soluble alcohol solvent is preferably 1 to 11% by weight, and more preferably 4 to 8% by weight relative to the whole of the ink composition. When the content is less than 4% by weight, the slightly water-soluble alcohol solvent cannot be dissolved in ink in some cases. When the content exceeds 8% by weight, the ink initial viscosity is undesirably increased in some cases.

The content of the slightly water-soluble alcohol solvent is preferably 1 to 3% by weight, and more preferably 1.5 to 2.5% by weight relative to the whole of the ink composition. When the content is less than 1% by weight, printing sports may occur on a recording medium with low ink absorption, such as printing paper for running-on.

When the content exceeds 3% by weight, the slightly water-soluble alcohol solvent is not completely dissolved in ink in some cases.

The content of the water-soluble alkanediol is preferably 1 to 11% by weight, and more preferably 3 to 8% by weight relative to the whole of the ink composition. When the content is less than 3% by weight, the slightly water-soluble alcohol solvent cannot be dissolved in ink in some cases. When the content exceeds 8% by weight, the ink initial viscosity is undesirably increased in some cases.

The content of the water-soluble alkanetriol is preferably 1 to 11% by weight, and more preferably 3 to 8% by weight relative to the whole of the ink composition. When the content is less than 3% by weight, white stripes or a feel of roughness may occur when printing is performed on printing paper for running on with low resolution. When the content exceeds 8% by weight, the drying property of a print immediately after printing may be degraded.

The black ink composition contains a surfactant as an essential component. By using a surfactant, images having excellent glossiness can be realized on a recording medium having a surface coated with a resin for receiving ink, particularly a recording medium such as photographic paper or the like in which glossiness is regarded as important. In particular, even when a recording medium including a surface receiving layer provided with a coating layer for receiving oil-based ink, e.g., printing paper for running-on, is used, it is possible to prevent bleeding between colors and prevent whitening due to reflected light with an increase in ink deposit. As the surfactant, the same as those used for the clear ink composition can be used.

The black ink composition preferably contains, as a dispersant for dispersing pigments, at least one resin selected from styrene-acrylic acid copolymer resins, urethane resins, fluorene resins, and the like. These copolymer resins adsorb on pigments to improve dispersibility.

Examples of hydrophobic monomers in the copolymer resin include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, ally acrylate, ally methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, vinyltoluene, and the like. These monomers may be used alone or as a mixture of two or more.

Specific examples of hydrophilic monomers include acrylic acid, methacrylic acid, maleic acid, itaconic acid, and the like.

From the viewpoint of satisfying glossiness of a color image, bronzing prevention, and storage stability of the ink composition and forming a color image more excellent in glossiness, the copolymer resin of hydrophobic monomer and hydrophilic monomer is preferably at least one of styrene-(meth)acrylic acid copolymer resins, styrene-methylstyrene-(meth)acrylic acid copolymer resins, styrene-maleic acid copolymer resins, (meth)acrylic acid-(meth)acrylate copolymer resins, and styrene-(meth)acrylic acid-(meth)acrylate copolymer resins.

The copolymer resin may be a resin (styrene-acrylic acid resin) containing a polymer produced by reaction between styrene and acrylic acid or acrylate. The copolymer resin may be an acrylic acid-based water-soluble resin or a sodium, potassium, or ammonium salt of such a resin.

From the viewpoint of satisfying glossiness of a color image, bronzing prevention, and storage stability of the ink composition and forming a color image further excellent in glossiness, the content of the copolymer resin is preferably 10 to 50 parts by weight and more preferably 10 to 35 parts by weight relative to 100 parts by weight of the pigment.

In the present invention, when a urethane resin is used as a pigment dipersant, it is possible to satisfy glossiness of a color image, bronzing prevention, and storage stability of the ink composition and form a color image further excellent in glossiness. A urethane resin is a resin including a polymer produced by reaction between a diisocyanate compound and a diol compound. In the present invention, the urethane resin preferably contains a urethane bond and/or amide bond and an acid group.

Examples of the diisocyanate compound include aliphatic diisocyanate compounds such as hexamethylene diisocyanate, 2,2,4-trimethylhexamethylene diisocyanate, and the like; aromatic diisocyanate compounds such as toluylene diisocyanate, phenylmethane diisocyanate, and the like; and modified products thereof.

Examples of the diol compound include polyethers such as polyethylene glycol, polypropylene glycol, and the like; polyesters such as polyethylene adipate, polybutylene adipate, and the like; and polycarbonates.

The urethane resin preferably contains a carboxyl group.

In the present invention, a fluorene resin can be also used as the pigment dispersant.

The weight ratio (former/latter) of the copolymer resin to the urethane resin is preferably 1/2 to 2/1. From the viewpoint of satisfying glossiness of a color image, bronzing prevention, and storage stability of the ink composition and forming a color image further excellent in glossiness, the weight ratio is more preferably 1/1.5 to 1.5/1.

From the viewpoint of satisfying glossiness of a color image, bronzing prevention, and storage stability of the ink composition and forming a color image further excellent in glossiness, the weight ratio (former/latter) of the solid content of the pigment to the solid content other than the pigment is preferably 100/20 to 100/80.

From the viewpoint of satisfying glossiness of a color image, bronzing prevention, and storage stability of the ink composition and forming a color image further excellent in glossiness, the content of the copolymer resin is preferably 10 to 50 parts by weight, more preferably 10 to 35 parts by weight, relative to 100 parts by weight of the pigment.

From the viewpoint of satisfying glossiness of a color image, bronzing prevention, and storage stability of the ink composition and forming a color image further excellent in glossiness, the content of the urethane resin is preferably 10 to 40 parts by weight, more preferably 10 to 35 parts by weight, relative to 100 parts by weight of the pigment.

From the viewpoint of satisfying glossiness of a color image, bronzing prevention, and storage stability of the ink composition and forming a color image further excellent in glossiness, the content of the fluorene resin is preferably 20 to 200 parts by weight, more preferably 10 to 80 parts by weight, relative to 100 parts by weight of the pigment.

From the viewpoint of satisfying glossiness of a color image, bronzing prevention, and storage stability of the ink composition and forming a color image further excellent in glossiness, the total amount of the copolymer resin and the urethane resin is preferably 90 parts by weight or less (more preferably 70 parts by weight or less) relative to 100 parts by weight of the pigment.

From the viewpoint of satisfying glossiness of a color image, bronzing prevention, and storage stability of the ink composition and forming a color image further excellent in glossiness, the acid value of the copolymer resin is preferably 50 to 320, more preferably 100 to 250.

From the viewpoint of satisfying glossiness of a color image, bronzing prevention, and storage stability of the ink composition and forming a color image further excellent in glossiness, the acid value of the urethane resin is preferably 10 to 300, more preferably 20 to 100. The acid value refers to an amount by mg of KOH required for neutralizing 1 g of resin.

From the viewpoint of satisfying glossiness of a color image, bronzing prevention, and storage stability of the ink composition and forming a color image further excellent in glossiness, the weight-average molecular weight (Mw) of the copolymer resin is preferably 2,000 to 30,000, more preferably 2,000 to 20,000.

From the viewpoint of satisfying glossiness of a color image, bronzing prevention, and storage stability of the ink composition and forming a color image further excellent in glossiness, the weight-average molecular weight (Mw) of the urethane resin before crosslinkage is preferably 100 to 200,000, more preferably 1,000 to 50,000. Mw is measured by, for example, GPC (Gel Permeation Chromatography).

From the viewpoint of satisfying glossiness of a color image, bronzing prevention, and storage stability of the ink composition and forming a color image further excellent in glossiness, the glass transition temperature (Tg: measured according to JIS K 6900) of the copolymer resin is preferably 30° C. or more, more preferably 50 to 130° C.

From the viewpoint of satisfying glossiness of a color image, bronzing prevention, and storage stability of the ink composition and forming a color image further excellent in glossiness, the glass transition temperature (Tg: measured according to JIS K 6900) of the urethane resin is preferably −50° C. to 200° C., more preferably −50 to 100° C.

The copolymer resin adsorbs on the pigment or is free from the pigment in the pigment dispersion. From the viewpoint of satisfying glossiness of a color image, bronzing prevention, and storage stability of the ink composition and forming a color image further excellent in glossiness, the maximum particle diameter of the copolymer resin is preferably 0.3 μm or less, and the average particle diameter of the copolymer resin is preferably 0.2 μm or less (more preferably 0.1 μm or less). The average particle diameter represents an average of disperse diameters (cumulative 50% diameter) of pigment particles actually formed in the dispersion and can be measured by, for example, Microtrack UPA (Microtrack Inc.).

The fluorene resin is not particularly limited as long as it is a resin having a fluorene skeleton. For example, the fluorene resin can be produced by copolymerizing the monomer units given below.

cyclohexane, 5-isocyanato-1-(isocyanatomethyl)-1,3,3-trimethyl (CAS No. 4098-71-9)
ethanol, 2,2'-[9H-fluorene-9-indenebis(4,1-phenyleneoxy)]bis (CAS No. 117344-32-8)
propionic acid, 3-hydroxy-2-(hydroxymethyl)-2-methyl (CAS No. 4767-03-7)
ethaneamine, N,N-diethyl-(CAS No. 121-44-8)

Also, a surfactant may be used as the dispersant. Examples of such a surfactant include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. Of course, these surfactants, when added to the ink composition, function also as a surfactant.

As water and other components, the same as those described above for the clear ink composition can be used.

In the present invention, examples of a pigment preferably usable in the yellow ink composition include C. I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185. The pigments are used alone or a mixture of two or more. In particular, at least one pigment selected from the group consisting of C. I. Pigment Yellow 74, 110, 128, 129, and 147 is preferably used. In particular, a mixture of C. I. Pigment Yellow 74 and 129 can realize an image with more excellent color hue.

The pigment solid content of the yellow ink composition used in the ink set according to the present invention is not particularly limited, but is preferably 6% by weight or more from the viewpoint of securing the color development properties in a recorded image.

As an alcohol solvent, a surfactant, a dispersant, water and other components to be added to the magenta ink, the same as those described above for the black ink composition can be added.

Examples of a pigment contained in the magenta ink composition used in the ink set according to the present invention include C. I. Pigment Red 5, 7, 12, 48 (Ca), 48 (Mn), 57 (Ca), 57:1, 112, 122, 123, 168, 184, 202, and 209, and C. I. Pigment Violet 19. The pigments are used alone or a mixture of two or more. In particular, at least one pigment selected from the group consisting of C. I. Pigment Red 122, 202, and 209, and C. I. Pigment Violet 19 is preferably used. In particular, when a solid solution of γ-type C. I. Pigment Violet 19 and C. I. Pigment Red 202 is used as the pigment, an image with more excellent color hue can be realized.

The expression "a solid solution of γ-type C.I. Pigment Violet 19 and C.I. Pigment Red 202" represents a crystal in which γ-type C.I. Pigment Violet 19 and C.I. Pigment Red 202 are solid-dissolved in each other.

The amount ratio between γ-type C.I. Pigment Violet 19 and C.I. Pigment Red 202 in the solid solution can be appropriately controlled within a range of the present invention, but the weight of γ-type C.I. Pigment Violet 19 is preferably larger than the weight of C.I. Pigment Red 202.

The pigment solid content of the magenta ink composition used in the ink set according to the present invention is not particularly limited, but is preferably 6% by weight or more from the viewpoint of securing the color development properties in a recorded image.

As an alcohol solvent, a surfactant, a dispersant, water and other components to be added to the magenta ink, the same as those described above for the black ink composition can be added.

Examples of a pigment contained in the cyan ink composition used in the ink set according to the present invention include C. I. Pigment Blue 1, 2, 3, 15:3, 15:4, 15:34, 16, 22, and 60, C. I. Vat Blue 4 and 60. The pigments are used alone or a mixture of two or more. In particular, C. I. Pigment Blue 15:3 and/or 15:4 is preferably used. In particular, when C. I. Pigment Blue 15:3 is used, an image with more excellent color hue can be realized.

The pigment solid content of the cyan ink composition used in the ink set according to the present invention is not particularly limited, but is preferably 6% by weight or more from the viewpoint of securing the color development properties in a recorded image.

As an alcohol solvent, a surfactant, a dispersant, water, and other components to be added to the cyan ink, the same as those described above for the black ink composition can be added.

Ink Jet Recording Method

The ink jet recording method according to the present invention uses at least the clear ink composition, the yellow ink composition, the magenta ink composition, and the cyan ink composition as the ink composition and includes ejecting droplets of the ink composition and adhering the droplets to a recording medium.

With respect to the adhesion order of ink droplets to the recording medium, droplets of any one of the black ink composition, the yellow ink composition, the magenta ink composition, and the cyan ink composition may be adhered to the recording medium, and then droplets of the clear ink composition may be adhered to the recording medium. Conversely, droplets of the clear ink composition may be adhered to the recording medium, and then droplets of any one of the black ink composition, the yellow ink composition, the magenta ink composition, and the cyan ink composition may be adhered to the recording medium. Also, droplets of any one of the black ink composition, the yellow ink composition, the magenta ink composition, and the cyan ink composition and droplets of the clear ink composition may be substantially simultaneously adhered to the recording medium. The term "substantially simultaneously" represents ink compositions are ejected from different nozzle lines in the same head of a printer to perform printing within the same derive.

In the recording method according to the present invention, synthetic paper or printing paper for running-on is preferably used as the recording medium. In particular, a high-quality image without white stripes and a feel of roughness can be realized with art paper, high-quality paper used for POD (print on demand), or laser printer paper even by printing with low resolution. Examples of high-quality paper for POD include Ricoh Business Coat Gloss 100 (manufactured by Ricoh Co., Ltd.) and the like. Examples of laser printer paper include LPCCTA4 (manufactured by Seiko Epson Corporation) and the like.

EXAMPLES

Although the present invention is described in further detail below with reference to examples, the present invention is not limited to these examples.
<Clear Ink Composition>
Preparation of Polymer Fine Particles (Sulfonate Group-Containing Polymer)

The following components were placed in a 2-liter beaker and were stirred at 100 rpm for 10 min to prepare a monomer emulsion.
Ethylenically Unsaturated Monomer:

| | |
|---|---|
| Methyl methacrylate | 348 g (58 parts) |
| Butyl acrylate | 240 g (40 parts) |
| Acrylic acid | 12 g (2 parts) |

Reactive emulsifier: 15% aqueous solution of Aqualon KH-10 30 g
(containing sulfuric ester group and polyoxyethylene group; manufactured by Dai-Ichi Kogyo Seiyaku Co., Ltd.)

Chain Transfer Agent:

| | |
|---|---|
| 2-Ethylhexylthioglycolate | 6 g |
| Water: | 450 g |

Next, 520 g of water and 90 g of the same reactive emulsifier (15% aqueous solution) as described above were placed in a 2-L separable flask and were heated to 60° C. under stirring at 180 rpm. Then, 2 g of ammonium persulfate was added, and the temperature of the mixture was raised to 70° C.

The thus-obtained monomer emulsion was gradually added to this aqueous reactive emulsifier solution while maintaining the polymerization temperature at 75° C. over a period of 3 hours to perform emulsion polymerization. Thereafter, the polymerization solution was heated to 80° C., followed by ripening for 1 hour and cooling. Next, the polymerization solution was neutralized and adjusted to pH 7.3 by the addition of a 10% aqueous ammonia solution.

The average particle diameter, the film forming temperature, and the weight-average molecular weight (Mw) of the resultant polymer fine particles were was measured. As a result, the average particle diameter was 50 nm, the film forming temperature was 15° C., and the weight-average molecular weight was Mw=45,000. The average particle diameter was measured with Photal PAR-III (manufactured by Otsuka Denshi K.K.). The film forming temperature was measured with a film forming temperature tester (manufactured by Rigaku Industrial Corporation). The weight average molecular weight was measured with a GPC apparatus (SC8010 (GPC), manufactured by Tosoh Corporation) using a calibration curve of standard polystyrene. The measuring conditions were as follows:
Eluent: tetrahydrofuran
Column: G4000HXL (manufactured by Tosoh Corporation)
Flow rate: 1000 μL/min
Column temp.: 40° C.

The components of each of the compositions shown in Table 1 were mixed to prepare a clear ink.

In the table, surfactant X is an organopolysiloxane surfactant composed of a compound of the formula (I) in which R is a hydrogen atom, a is an integer of 7 to 11, m is an integer of 30 to 50, and n is an integer of 3 to 5.

In addition, surfactant Y is an organopolysiloxane surfactant composed of a compound of the formula (I) in which R is a methyl group, a is an integer of 9 to 13, m is an integer of 2 to 4, and n is an integer of 1 to 2.

Further, surfactant Z is an organopolysiloxane surfactant composed of a compound of the formula (I) in which R is a methyl group, a is an integer of 6 to 18, m is 0, and n is 1.

TABLE 1

| | Example | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Resin (in terms of solid content) | AQUACER 5115 | 7 | 7 | 7 | 7 | 7 | 7 | 7 | 7 | 7 | 7 | 7 | 7 | 0 | 7 | 7 | 0 |
| | Sulfonate resin | 1 | 1 | 1 | 1 | 1 | 1 | 1 | 1 | 1 | 1 | 1 | 1 | 1 | 0 | 1 | 0 |
| | Chemipearl W4005 | 0.6 | 0.6 | 0.6 | 0.6 | 0.6 | 0.6 | 0.6 | 0.6 | 0.6 | 0.6 | 0.6 | 0.6 | 0.6 | 0.6 | 0 | 0 |
| Alcohol solvent | 1,2-Octanediol | 2 | 3 | 4 | 5 | 2 | 3 | 4 | 5 | 2 | 3 | 4 | 5 | 3 | 3 | 3 | 3 |
| | 1,2-Hexanediol | 3 | 3 | 3 | 3 | 5 | 5 | 5 | 5 | 10 | 10 | 10 | 10 | 5 | 5 | 5 | 5 |
| | Glycerin | 7 | 7 | 7 | 7 | 7 | 7 | 7 | 7 | 7 | 7 | 7 | 7 | 7 | 7 | 7 | 7 |

TABLE 1-continued

| Example | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Sur- | X | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| factant | Y | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Z | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Pure Water | * | * | * | * | * | * | * | * | * | * | * | * | * | * | * | * |
| | Total | 100 | 100 | 100 | 100 | 100 | 100 | 100 | 100 | 100 | 100 | 100 | 100 | 100 | 100 | 100 | 100 |

*: Balance

TABLE 2

| | Example | 17 | 18 | 19 | 20 | 21 | 22 | 23 | Comparative Example 1 | Comparative Example 2 |
|---|---|---|---|---|---|---|---|---|---|---|
| Resin (in terms of solid content) | AQUACER 515 | 7 | 7 | 7 | 7 | 7 | 7 | 7 | 7 | 7 |
| | Sulfonate resin | 1 | 1 | 1 | 1 | 1 | 1 | 1 | 1 | 1 |
| | Chemipearl W4005 | 0.6 | 0.6 | 0.6 | 0.6 | 0.6 | 0.6 | 0.6 | 0.6 | 0.6 |
| Alcohol solvent | 1,2-Octanediol | 3 | 3 | 3 | 3 | 3 | 3 | 3 | 0 | 0 |
| | 1,2-Hexanediol | 5 | 5 | 5 | 5 | 5 | 5 | 5 | 5 | 15 |
| | Glycerin | 7 | 7 | 7 | 7 | 7 | 7 | 7 | 7 | 7 |
| Sur- | X | 0 | 0.1 | 0 | 0 | 0.1 | 0 | 0.1 | 0.2 | 0.2 |
| factant | Y | 0 | 0 | 0.1 | 0 | 0 | 0.1 | 0 | 0.2 | 0.2 |
| | Z | 0 | 0 | 0 | 0.1 | 0 | 0.1 | 0.1 | 0.2 | 0.2 |
| | Pure water | * | * | * | * | * | * | * | * | * |
| | Total | 100 | 100 | 100 | 100 | 100 | 100 | 100 | 100 | 100 |

*: Balance

<Evaluation>
Measurement of Surface Tension

The dynamic surface tension at 10 Hz and 1 Hz was measured for each clear ink. Measurement was carried out using dynamic tensiometer BP-2 (manufactured by KRUSS) in an environment of 20° C.

The measurement results were as shown in Table 3.
Evaluation of Coagulation Spots Each of the clear inks thus obtained was loaded into an ink cartridge of an ink jet printer (PX-G900, manufactured by Seiko Epson Corporation). Printing was carried out on OK Top Coat Plus (manufactured by Oji Paper Co., Ltd.) with a resolution of 720×720 dpi. As a printing condition, in a single-direction recording method in which a resolution of 720×360 dpi per drive of the recording head was achieved, the amount of the ink ejected was adjusted so that the dot weight was 7 ng. The drive head was 200 cps.

In the resultant records, the presence of coagulation spots was determined by visual observation. The determination criteria were as follows:
 A: Coagulation spots and white stripes due to filling defects were not observed.
 B: Coagulation spots were not observed but white stripes due to filling defects were observed.
 C: Coagulation spots and white stripes due to filling defects were observed.

The evaluation results were as shown in Table 2.
Evaluation of Abrasion Resistance A black ink having the composition described below and each of the clear inks obtained as described above were loaded into an ink cartridge of an ink jet printer (PX-G900, manufactured by Seiko Epson Corporation). First, solid printing was carried out on OK Top Coat Plus (manufactured by Oji Paper Co., Ltd.) using the black ink with a resolution of 720×720 dpi, a dot weight of 7 ng per dot, and 3 mg/inch$^2$. Then, overcoat was performed on the black solid print using the clear ink with a resolution of 720×720 dpi, a dot weight of 3 ng per dot, and 1.0 mg/inch$^2$. Then, the print was dried by standing at room temperature.
<Black Ink Composition>

| Glycerin | 5.0% by weight |
|---|---|
| 1,2-Hexanediol | 1.0% by weight |
| 1,2-Octanediol | 2.0% by weight |
| 1,2,6-Hexanetriol | 6.0% by weight |
| Surfactant* | 0.3% by weight |
| Styrene-acrylic acid resin | 1.2% by weight |
| Fluorene resin | 1.2% by weight |
| C.I. Pigment Black 7 | 6.0% by weight |
| Pure water | balance |
| Total | 100.0% by weight |

The surfactant was an organopolysiloxane surfactant composed of a mixture of a compound of the formula (I) in which R is a methyl group, a is an integer of 9 to 13, m is an integer of 2 to 4, and n is an integer of 1 to 2 and a compound of the formula (I) in which R is a hydrogen atom, a is an integer of 7 to 11, m is an integer of 30 to 50, and n is an integer of 3 to 5.

Then, a test with a load of 500 g was performed ten times using a Gakushin-type color fastness/rubbing tester (AB-301, manufactured by Tester Sangyo, Ltd.) to evaluate transfer, gloss spots, and scratch resistance.

The transfer evaluation criteria were as follows:
 A: The time required until the OD value in transfer to friction paper reached 0.1 or less was less than 10 minutes.

B: The time required until the OD value in transfer to friction paper reached 0.1 or less was 10 minutes to less than 4 hours.

C: The time required until OD value in the transfer to friction paper reached 0.1 or less was 4 hours or more.

The gloss spots were evaluated by visually evaluating glossiness of a print before and after the rubbing test. The glossiness evaluation criteria were as follows:

A: There was no portion where glossiness appeared to be improved from that before the test.

B: There was a portion where glossiness appeared to be improved from that before the test. The scratches on a print were visually evaluated before and after the rubbing test. The scratch resistance evaluation criteria were as follows:

A: No linear scratch of 0.5 mm or more was observed.

B: One to two linear scratches of 0.5 mm or more were observed.

C: Three or more linear scratches of 0.5 mm or more were observed.

The evaluation results were as shown in Table 3.

TABLE 3

| | Surface tension (mN/m) | | | Coagula-tion spots | Abrasion resistance | | |
|---|---|---|---|---|---|---|---|
| | A: 10 Hz | B: 1 Hz | A − B | | Trans-fer | Glossy spots | Scratch resistance |
| Example 1 | 24.7 | 24.0 | 0.7 | A | A | A | A |
| Example 2 | 24.2 | 23.3 | 0.9 | A | A | A | A |
| Example 3 | 23.8 | 22.9 | 0.9 | A | A | A | A |
| Example 4 | 23.6 | 22.8 | 0.8 | A | A | A | A |
| Example 5 | 24.9 | 24.3 | 0.6 | A | A | A | A |
| Example 6 | 24.4 | 23.8 | 0.6 | A | A | A | A |
| Example 7 | 24.1 | 23.4 | 0.7 | A | A | A | A |
| Example 8 | 24.0 | 23.2 | 0.7 | A | A | A | A |
| Example 9 | 25.6 | 24.9 | 0.7 | B | B | B | B |
| Example 10 | 25.5 | 24.8 | 0.7 | B | B | B | B |
| Example 11 | 25.1 | 24.2 | 0.9 | B | B | B | B |
| Example 12 | 24.7 | 23.8 | 0.9 | B | B | B | B |
| Example 13 | 24.0 | 23.2 | 0.8 | A | B | A | B |
| Example 14 | 24.0 | 23.2 | 0.8 | A | A | B | A |
| Example 15 | 24.0 | 23.2 | 0.8 | A | A | A | C |
| Example 16 | 24.0 | 23.2 | 0.8 | A | B | B | C |
| Example 17 | 24.2 | 23.6 | 0.6 | A | A | A | A |
| Example 18 | 24.3 | 23.4 | 0.9 | A | A | A | A |
| Example 19 | 24.0 | 23.2 | 0.8 | A | A | A | A |
| Example 20 | 24.1 | 23.3 | 0.8 | A | A | A | A |
| Example 21 | 23.9 | 23.2 | 0.7 | A | A | A | A |
| Example 22 | 24.2 | 23.3 | 0.9 | A | A | A | A |
| Example 23 | 24.3 | 23.4 | 0.9 | A | A | A | A |
| Comp. Example 1 | 31.0 | 29.7 | 1.3 | C | A | C | A |
| Comp. Example 2 | 26.6 | 25.3 | 1.3 | A | C | C | C |

What is claimed is:

1. A clear ink composition comprising at least a slightly water-soluble alkanediol having a solubility in water of less than 1.0 g/100 g of water, a water-soluble alcohol as a dissolution aid for the slightly water-soluble alkanediol having a solubility in water of 10.0 g/100 g or more, water, and polymer fine particles, but not comprising a colorant, wherein a 10-Hz dynamic surface tension of the ink composition is 26 mN/m or less, wherein the slightly water-soluble alkanediol is at least one selected from the group consisting of 1,2-heptanediol, 1,2-octanediol, 5-methyl-1,2-hexanediol, 4-methyl-1,2-hexanediol, and 4,4-dimethyl-1,2-pentanediol, and wherein the content ratio between the slightly water-soluble alkanediol and the water-soluble alcohol is 5:3 to 1:5.

2. The clear ink composition according to claim 1, wherein a difference between 10-Hz dynamic surface tension and 1-Hz dynamic surface tension of the ink composition is 1 mN/m or less.

3. The clear ink composition according to claim 1, wherein the content ratio between the slightly water-soluble alkanediol and the water-soluble alcohol is 5:3 to 1:1.

4. The clear ink composition according to claim 1, wherein the content of the slightly water-soluble alkanediol is 2.0 to 5.0% by weight.

5. The clear ink composition according to claim 1, wherein the content of the water-soluble alcohol is 3.0 to 10.0% by weight.

6. The clear ink composition according to claim 1, wherein the slightly water-soluble alkanediol is an alkanediol having 7 to more carbon atoms.

7. The clear ink composition according to claim 1, wherein the polymer fine particles are of at least one type selected from the group consisting of (i) a sulfonate group-containing polymer, (ii) a modified polyolefin emulsion, and (iii) polyolefin wax.

8. The clear ink composition according to claim 7, wherein the sulfonate group-containing polymer is produced by emulsion polymerization of an ethylenically unsaturated monomer in the presence of a reactive emulsifier containing a hydrophilic group, a hydrophobic group, and a radical reactive group.

9. The clear ink composition according to claim 7, wherein the modified polyolefin emulsion is produced by modifying polypropylene or polyethylene having a weight-average molecular weight (Mw) of 1,000 to 50,000 with an unsaturated carboxylic acid or an anhydride thereof, and then dispersing the modified product in water in the presence of a basic compound and an emulsifier.

10. The clear ink composition according to claim 1, further comprising a surfactant.

11. The clear ink composition according to claim 10, wherein the content of the surfactant is 0.01 to 1.0% by weight relative to the ink composition.

12. The clear ink composition according to claim 11, wherein the surfactant is an organopolysiloxane surfactant.

13. The clear ink composition according to claim 12, wherein the organopolysiloxane surfactant contains at least one compound represented by the following formula:

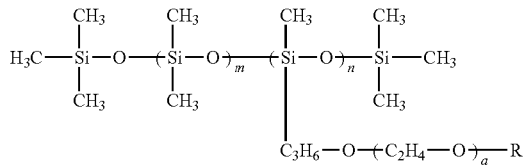

wherein R represents a hydrogen atom or a methyl group, a represents an integer of 2 to 11, m represents an integer of 2 to 50, and n represents an integer of 1 to 5.

14. The clear ink composition according to claim 12, wherein the organopolysiloxane surfactant contains at least one compound represented by the following formula:

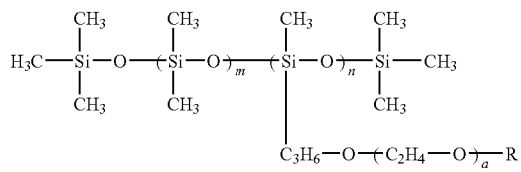

wherein R represents a hydrogen atom or a methyl group, a represents an integer of 2 to 13, m represents an integer of 2 to 50, and n represents an integer of 1 to 5.

15. The clear ink composition according to claim 12, wherein the organopolysiloxane surfactant contains at least one compound represented by the following formula:

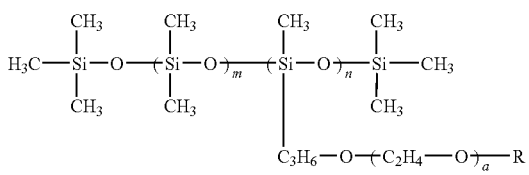

wherein R represents a hydrogen atom or a methyl group, a represents an integer of 2 to 13, m represents an integer of 2 to 50, and n represents an integer of 1 to 8.

16. The clear ink composition according to claim 12, wherein the organopolysiloxane surfactant contains at least one compound represented by the following formula:

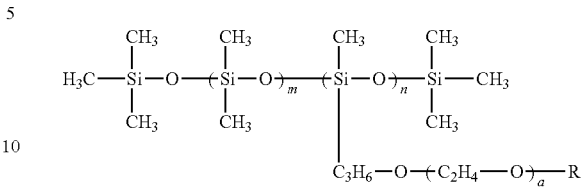

wherein R represents a methyl group, a represents an integer of 6 to 18, m is 0, and n is 1.

17. An ink set comprising a black ink composition, a yellow ink composition, a magenta ink composition, a cyan ink composition, and the clear ink composition according to claim 1, wherein at least one of the black ink composition, the yellow ink composition, the magenta ink composition, and the cyan ink composition has a 10-Hz dynamic surface tension of 26 mN/m or less.

18. The ink set according to claim 17, wherein at least one of the black ink composition, the yellow ink composition, the magenta ink composition, and the cyan ink composition has a difference of 1 mN/m or less between 10-Hz dynamic surface tension and 1-Hz dynamic surface tension.

19. A ink jet recording method comprising ejecting droplets of an ink composition and depositing the droplets to a recording medium, wherein the ink set according to claim 17 is used as the ink composition.

20. The method according to claim 19, wherein droplets of any one of the black ink composition, the yellow ink composition, the magenta ink composition, and the cyan ink composition are adhered to the recording medium, and then droplets of the clear ink composition are adhered to the recording medium.

21. The method according to claim 19, wherein droplets of the clear ink composition are adhered to the recording medium, and then droplets of any one of the black ink composition, the yellow ink composition, the magenta ink composition, and the cyan ink composition are adhered to the recording medium.

22. The method according to claim 19, wherein droplets of any one of the black ink composition, the yellow ink composition, the magenta ink composition, and the cyan ink composition and droplets of the clear ink composition are substantially simultaneously adhered to the recording medium.

23. The method according to claim 19, wherein the recording medium is synthetic paper composed of a synthetic resin as a main material, or printing paper for running-on.

* * * * *